United States Patent Office

2,866,805
Patented Dec. 30, 1958

2,866,805

ORGANIC PROCESS

Earl G. De Witt, Royal Oak, Mich., assignor to Ethyl Corporation, New York, N. Y., a corporation of Delaware No Drawing. Application November 16, 1953
Serial No. 392,454

1 Claim. (Cl. 260—461)

This invention relates to an improved process for the manufacture of haloaliphatic esters of phosphorus. In particular this process relates to the manufacture of haloaliphatic thionophosphates.

The β-(haloaliphatic) thionophosphates have wide utility in the chemical arts. These materials have been suggested as plasticizers, fuel and lubricant additives, flame-proofing agents, chemical intermediates and the like. Prior to this invention there was no direct method for their manufacture which utilized available raw materials and provided a product substantially free of unwanted by-products.

It is, therefore, an object of this invention to provide a new process for the manufacture of β-(haloaliphatic) thionophosphates. It is a further object of this invention to provide new chemicals. This and other objects will become more apparent from the further description hereinafter.

The process of this invention comprises reaction of tri-(β-haloaliphatic) phosphite or thiolophosphite with sulfur to provide tri-(β-haloaliphatic) thionophosphite or tri-(β-haloaliphatic) thiolothionophosphate.

In general this process comprises adding elemental sulfur to tri-(β-haloaliphatic) esters of trivalent acids of phosphorus at a temperature between about 20 and 200° C. under conditions such as to remove the heat of reaction and recovering the neutral β-(haloaliphatic) ester of a pentavalent thiono acid of phosphorus.

It has been previously observed that tri-(aliphatic) phosphites, wherein the aliphatic group is unsubstituted with chlorine or bromine, react with sulfur only with some difficulty to produce the corresponding thionophosphates, requiring elevated temperatures, that is heat energy must be supplied. Likewise use of a solvent is a necessity for a practical process. Introduction of halogen into organic phosphorus derivatives ordinarily imparts to the molecule increased stability and resistance to chemical reaction and in general a relatively inert chemical character to the molecule. Despite these observations it is my surprising discovery that reaction of sulfur with tri-(β-haloaliphatic) esters of trivalent acids of phosphorus proceeds readily at a relatively low temperature to provide a smooth controllable reaction leading to the desired products in high yield and purity. Indeed, heat is liberated in my process. The stabilizing effect of halogen is demonstrated in the resulting tri-(β-haloaliphatic) thionophosphate or thiolothionophosphate as these materials are unusually stable to oxidation and hydrolytic cleavage, contrary to the properties of the analogous materials unsubstituted with halogen.

The phosphite and thiolophosphite esters which form the reactant in the process of this invention can be prepared by a variety of methods. Thus, treatment of a β-haloaliphatic alcohol with a trihalide of phosphorus results in the formation of a corresponding tri-(β-haloaliphatic) phosphite. Similarly reaction between β-haloaliphatic mercaptans with a phosphorus trihalide result in the formation of the corresponding tri-(β-halo-aliphatic) thiolophosphite. Another suitable method for preparation of the phosphite precursors employed in this process comprises reaction between carbonate esters of glycol and trihalides of phosphorus. One method of employing the process of this invention, which is preferred in some instances as it provides products not obtainable by other methods, comprises a dual process wherein an organic cyclic chalcogen, that is an aliphatic epoxide or an aliphatic cyclic sulfide, is first reacted with a phosphorus trihalide and the product of this reaction subsequently treated with elemental sulfur in accordance with my invention. One advantage accruing from this dual process resides in the formation of products containing an isomeric mixture of the tri-(β-haloaliphatic) esters of pentavalent thiono acids of phosphorus, particularly where the organic cyclic chalcogen is asymmetrical. This results from the initial cleavage of the cyclic chalcogen bond by the phosphorus trihalides in each of two positions, leading in the one instance to phosphite esters having the formula of

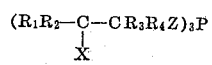

and in the other, to phosphite esters having the formula

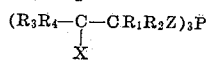

wherein Z is the chalcogen, that is sulfur or oxygen, X is halogen and R is an organic or inorganic radical. These isomeric mixtures are found to possess properties which make them particularly suitable for certain uses, e. g., as fuel additives.

In conducting the process of my invention the reaction proceeds favorably if stoichiometric equivalents of the reaction are employed. If, however, an excess of sulfur is employed this excess can be removed by conventional methods such as filtration or centrifugation, and the resulting product is suitable for use in most instances. Likewise if an excess of the phosphite ester is employed this can be removed if desired by simple distillation. Similarly when the duel process of this invention is employed the excess reagent can be removed by conventional means and the residual product is entirely satisfactory for most purposes. A solvent may be employed, although this is not critical to the successful conduct of the reaction. Furthermore, the reaction can be conducted in the presence of the product formed by the process of this invention. This embodiment is particularly adaptable to a continuous process and contributes to ease of manipulation and temperature control.

As noted the process of this invention occurs with the liberation of heat. One method of controlling the reaction is to provide means for removal of heat. One such means comprises the employment of a low boiling solvent and conducting the operation at a temperature and pressure at which this solvent refluxes.

The reaction between sulfur and the β-(haloaliphatic) esters of trivalent acids of phosphorus can be represented by the general equation

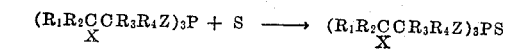

wherein Z is the chalcogen, that is oxygen or sulfur, X is halogen and each of $R_1$, $R_2$, $R_3$ and $R_4$ are organic radicals or hydrogen. In those embodiments wherein the groups R are organic radicals, they can be aliphatic or aromatic and among the aliphatic radicals I can employ alkyl groups, alkenyl groups, cycloalkyl groups, alphyl groups and the like. Such organic radicals can be further substituted with radicals which are substantially inert to sulfur under the conditions of my process. In other embodiments of this invention such groups R can be inorganic radicals, such as for example halogen atoms, nitrogen-containing, sulfur-containing and oxygen-containing groups and the like. Furthermore when the groups R are organic radicals they can be acyclic, carbocyclic or heterocyclic.

To further illustrate the reactants and products of my invention I can react the following phosphites, for example, with sulfur to obtain the indicated thionophosphates: β-chloroethyl phosphite to yield β-chloroethyl thionphosphate; β-bromoethyl phosphite to yield β-bromoethyl thionophosphate; β-iodoethyl phosphite to yield β-iodoethyl thionophosphate; β-chloroethyl thiolophosphite to yield β-chloroethyl thiolothionophosphate; β-chloropropyl phosphite to yield β-chloropropyl thionophosphate; β-chloropropyl thiolophosphite to yield β-chloropropyl thiolothionophosphate; β-chlorobutyl phosphites and thiolophosphites to yield the corresponding β-chlorobutyl thionophosphates and thiolothionophosphates; 2,3-dichloropropyl phosphite to yield 2,3-dichloropropyl thionophosphate; 2-chloro-Δ-3-butenyl phosphite and thiolophosphite to yield 2-chloro-Δ-3-butenyl thionophosphate and thiolothionophosphate, respectively; 2-chlorovinyl phosphite and thiolophosphite to yield 2-chlorovinyl thionophosphate and thiolophosphate, respectively; 2-chloro-3-cyclohexylpropyl phosphite to yield 2-chloro-3-cyclohexylpropyl thionophosphate: 2,3-dichloro-2-cyclohexylpropyl phosphite and thiolophosphite to yield the corresponding thionophosphate and thiolothionophosphate, respectively; 2-bromo-2-phenylethyl phosphite to yield 2-bromo-2-phenyl thionophosphate; 2-bromo-3,3-diphenylpropyl phosphite and thiolophosphite to yield 2-chloro-3,3-diphenyl thionophosphate and 2-chloro-3,3-diphenyl thiolothionophosphate, respectively, and the like.

The form in which the sulfur is employed is not critical and equally good results are obtained with ordinary flowers of sulfur, resublimed flowers of sulfur, amorphous sulfur, or the various crystalline forms of sulfur including the monoclinic or rhombic forms as well as commercial powdered sulfur. The sulfur can be introduced directly into the reaction in solid form or in molten form. For some purposes it may be preferred, as for example in a continuous operation, to employ the sulfur dissolved in a suitable inert solvent.

My process can be carried out at temperatures ranging from about 20 to 200° C. Best results are obtained in the range of about 50 to 100° C.

It is a particular feature of this invention and one which provides an unexpected advantage that a solvent is not necessary. The reaction is controllable and is conducted at moderate temperatures employing only the three aforementioned types of reactants.

The following examples more clearly illustrate the process of the present invention.

Example I

To 547.8 parts of tris-2-chloroethyl phosphite in a reaction vessel equipped with a mechanical agitator, reflux condenser and solid-feed means was added 66 parts of sulfur at a temperature of 60–70° C. After a reaction period of 40 minutes at this temperature the mixture was cooled and filtered to remove unreacted sulfur. The residual product comprised tris-(2-chloroethyl thionophosphate in 97 percent yield. The product was a clear, very light yellow liquid having an index refraction of $n_D^{20}$ 1.5080.

When the above procedure is carried out with other phosphite and thiolophosphite esters of the present invention, equally good results are obtained. Other phosphorus halides can be used with similar results.

The following Example II illustrates the results obtained using a preferred embodiment of the present invention, namely the reaction of a cyclic organic oxide with phosphorus trihalide to form a β-haloalkyl phosphite and subsequent reaction of this product with sulfur to form the desired thionophosphate.

Example II

To the apparatus as described in Example I was added 137.5 parts of phosphorus trichloride ($PCl_3$) and then 191.4 parts of propylene oxide over a period of 30 minutes. Since the reaction was considerably exothermic, the temperature of the reactants was kept below 35° C. by the application to the reaction vessel of a Dry-Ice bath. After the reaction was completed, excess propylene oxide was removed by vacuum evaporation over a water bath. To the intermediate product was added 33 parts of resublimed flowers of sulfur in incremental proportions over a period of 40 minutes while maintaining the temperature in the order of about 60° C. Upon completing this addition, the liquid reaction mixture was cooled with an ice bath and filtered to remove unreacted sulfur. The product obtained was a clear, very light yellow liquid having an index of refraction of $n_D^{21.5}$ 1.4910. From this reaction 332 parts of β-chloropropyl thionophosphate were obtained amounting to a 97 percent yield. Its boiling range at one millimeter pressure was 140–160° C.

I claim:

A process for the manufacture of tri-(β-chloropropyl) thionophosphate which comprises the steps of reacting together at a temperature of about 35° C. a mixture consisting of approximately three moles of propylene oxide per mole of phosphorus trichloride, and then adding elemental sulfur to the resulting product while keeping the temperature of the latter reaction mixture in the range of about 60 to 70° C., the addition being in incremental portions until there has been added about one mole of sulfur per mole of phosphorus trichloride originally used and the time period of the addition being no longer than about 40 minutes.

References Cited in the file of this patent

UNITED STATES PATENTS

| | | |
|---|---|---|
| 2,536,647 | Kosolapoff | Jan. 2, 1951 |
| 2,589,326 | Oberright | Mar. 18, 1952 |
| 2,610,978 | Lanham | Sept. 16, 1952 |
| 2,724,719 | Markley | Nov. 22, 1955 |

OTHER REFERENCES

Kosolapoff: Organo Phosphorous Compounds, pp. 185, 235–6 (1950).